Oct. 11, 1938.   J. G. W. GENTELE   2,132,897
METHOD OF AND APPARATUS FOR DRYING SUBSTANCES WHICH CONTAIN LIQUIDS
Filed Sept. 20, 1935
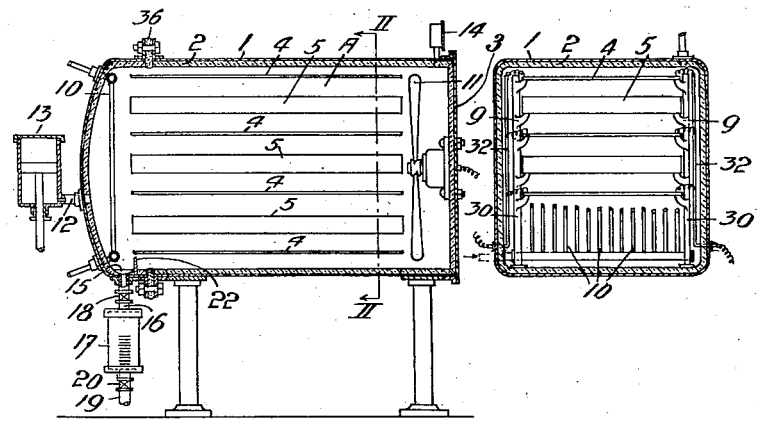
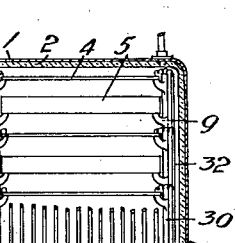
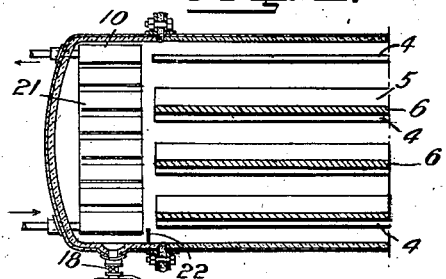
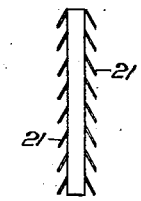
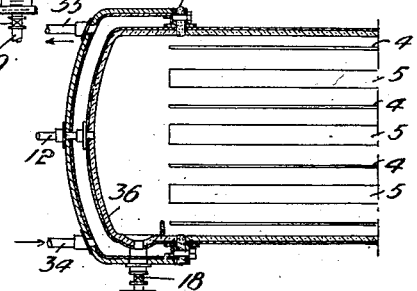
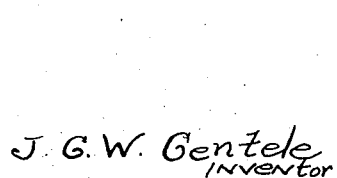
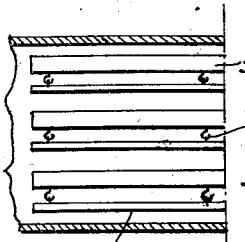
J. G. W. Gentele
INVENTOR
By Glascock Downing Seebold
Attys.

Patented Oct. 11, 1938

2,132,897

UNITED STATES PATENT OFFICE 2,132,897

METHOD OF AND APPARATUS FOR DRYING SUBSTANCES WHICH CONTAIN LIQUIDS

Johan Georg Wilhelm Gentele, Stockholm, Sweden

Application September 20, 1935, Serial No. 41,486
In Sweden September 27, 1934

2 Claims. (Cl. 34—30)

The subject of the present invention is a method for vacuum drying of vegetable or animal products, for example, vegetables, berries, fish, eggs, milk, etc.

When drying substances in vacuo according to the methods hitherto used, the substances to be dried have been laid on supports which have been directly heated, or which, on account of their not having been insulated, have been supplied with conducted heat, so that the supports have, in the course of the process, become practically as hot as the source of heat. As a result of the direct contact between the substances to be dried and these comparatively hot surfaces, rapid evaporation of moisture takes place at the places of contact, as a result of which the substances of these places change their appearance and their biological composition, for example by burning. As soon as the substances to be dried have been changed at the places of contact in the manner described, the same phenomenon occurs in the next layer of the substances and so on. In addition, the strain between the rapidly dried portions of the substances and the portions which are still moist, which arises as a result of the difference in temperature, causes the substances to change their shape by bursting.

In one known method of vacuum drying vegetables or the like, rotating cylinders, indirectly heated by steam or the like have been used, or even vacuum drying has been carried out in stationary apparatus. The substance to be dried has then been supported by the walls of the rotating apparatus and on shelves or similar supports in the stationary apparatus. These supports for the substances have either been sources of heat themselves or else they have been in direct, heat-conducting contact with the sources of heat and the walls of the apparatus, so that the heat has been transmitted by conduction to the shelves or other supports so that they have, during the process, become substantially as hot as the sources of heat. As a result, the same risk of burning and changes in colour exists with these both forms of apparatus.

In order to avoid this danger; it has hitherto been necessary to keep the temperature of the sources of heat comparatively low, for example, not higher than 70–90° C., but this has, in its turn, contributed to making the drying process slow. It is practically impossible to dry by these methods substances which undergo change at comparatively low temperatures, such as egg- and meat-albumen, milk etc.

It is a well-known fact that the quantity of moisture which can be removed per unit of time, and, consequently, the time of drying, depends not only on the temperature but also on the speed with which the vapour above the substances to be dried is removed. In fact, one of the principal defects of the methods and apparatus for vacuum drying hitherto used is that the water vapour above the substances to be dried is not removed quickly enough, which has had a considerable effect towards prolonging the time of drying and making the processes expensive. In addition, the water-vapour has hitherto had to be sucked out by the vacuum pump, as a result of which it has not been possible to maintain a sufficiently high vacuum.

The principal difference between the present invention and the methods hitherto known is that the substance to be dried is, during the process, subjected solely to the effects of radiated heat. The rays of heat then pass into and through the substance to be dried and are uniformly divided throughout the same without any deleterious effect on the surfaces which are first met by the rays. As a result of the even temperature throughout the substance, which is thereby attained, the water at practically every point in the substance is caused to boil at the temperature corresponding to the vacuum. In this way, the evaporation in the inner portions of the substance conveys moisture also to the outer layers so that the humidity of the substance remains homogeneous. In this way, burning of the outer portions is prevented since the temperature even in these outer portions cannot, as long as moisture is present in them, rise above the boiling point of water in the existing vacuum, say 27° C. in a 730 mm. vacuum.

The radiation of heat according to the present invention may take place at practically any height of temperature. However, the principal advantage, in comparison with known methods, consists in that much higher temperatures can be used, for example 200–500° C. or higher, without change in the appearance, chemical or biological composition of the substance as long as moisture is present. Only when the substance has lost so much moisture that its temperature rises above the boiling point of water in the existing vacuum does any danger of change arise and then the radiation should be gradually diminished and stopped at that point until the drying process is finished.

The fact that the radiation of heat can take place at very high temperatures without damage to the substance to be dried makes it possible to reduce considerably the time of drying.

Thus, the principal characteristic of the present invention is that, when being dried in vacuo, the substance to be dried, spread on stationary supports, is heated exclusively by radiated heat from one or more directions, the rays of heat being derived from sources of heat (heating elements) which together with the supports are insulated from heat conducting parts of the apparatus and placed at such a distance from the substance to be dried that the latter only receives radiated heat.

In order to prevent the direct conduction of heat from the sources of heat to the supports on which the substance to be dried lies, the sources of heat and, suitably, also the supports are well insulated from the heat-conducting parts of the apparatus. This insulation may be effected by means of asbestos, wooden laths or the like.

As has been mentioned above, it is important from the point of view of quick drying that the water vapour should be rapidly removed from the evaporation or drying zone of the apparatus. According to the present invention, this rapid conveying of the water vapour from the evaporation zone is effected by maintaining a temperature difference between the same and a cooling or condensing zone which is situated in or out of the evaporation zone. In said condensing zone the vapours are condensed and the water of condensation is drawn off from the same. The condensation zone may be formed thereby that one or more walls in the vacuum apparatus are formed as or provided with effective cooling members. In this way, the vapour is very rapidly removed from the evaporation zone owing to the difference in temperature between the evaporation zone and the cooling zone, in addition to which it is possible to further hasten the removal of the vapour from the evaporation zone by means of one or more fans in the evaporation zone. A condenser may also be placed outside the vacuum chamber, through which the vapour from the evaporation zone is in a known manner passed and condensed. However, in this manner, the vapour cannot be removed as quickly as if one or more of the walls in that zone are cooled.

Thus, in the application of the present invention, a chamber is used in which there is practically a complete vacuum. This chamber is divided into an evaporation zone and a cooling or condensation zone. The substance to be dried is placed in the former zone. If the difference in temperature between the two zones is sufficiently large and the cooling zone contains cooling surfaces of a sufficient size, the vapour is immediately condensed. Therefore, the only function of the vacuum pump is to create and maintain the vacuum. The vacuum pump should therefore be connected with the cooling zone. If the apparatus is arranged to work in this manner, then the conditions for the most rapid possible removal of the water vapour above the substance to be dried have been arrived at which in conjunction with the high radiation temperature brings about the most rapid possible drying of the substance to be dried. The evaporation zone is provided with suitable sources of heat, for example, spiral tubes, flat heat-batteries, etc. The heat may be transmitted by means of steam, hot water, hot air, etc. The most suitable method, however, is to use electric heating of some kind, for example, electric lamps, electric resistance elements, which, as has been indicated, should be well insulated from the other parts of the apparatus and placed at a proper distance from the substance to be dried. The advantage of electric heating is that it is easier to regulate the temperature, in addition to which, cooling can be effected quicker during the latter stage of the drying process. Therefore, heating elements with a low heat-resistance should be used.

The present invention makes it possible, as mentioned above, to supply heat by radiation, during the greater part of the process, at a considerably higher temperature than has hitherto been permissible, for example, 200°-500° C. or more, while the temperature of the substance to be dried nevertheless remains low, for example 27-32° C., when the vacuum is as high as possible. This possibility of supplying to the substance to be dried practically an unlimited quantity of calories, which has never hitherto been possible, makes the process of drying much more rapid. As the heat is applied exclusively by radiation, the moisture is removed carefully from the substance to be dried so that when berries, for example, are dried, they retain on the whole their natural shape and volume.

If the material to be dried is in the form of a liquid, for example, milk, cream, shelled eggs (yolk and white together), it is most advantageous to work the apparatus continuously over a relatively long period. The liquid substance is introduced continuously or periodically on to the stationary supports, which are fitted with raised edges, and this is done at such a speed that the quantity of material introduced corresponds to the quantity of moisture evaporated so that right up to the last stage of the process a certain quantity of moisture is present in the substance to be dried. When the supports have in this manner been filled and the requisite degree of dryness has been reached, the process is stopped. The liquid which is to be evaporated in this way is introduced through one or more pipes, which pass between the heat batteries and have their ends over the supports for the material to be dried. The ends of the pipes may suitably be in the form of sprayers of a convenient form, for example, pipes provided with perforations or slits.

As results from the foregoing description the most characteristic features of applicant's invention are:

1. That the substance to be dried is exclusively exposed to heat of radiation which is rendered possible by carefully insulating the inner walls of the evaporation zone and the heating elements and the supports for the substance to be dried so that heat is prevented from being conducted to the same, 2. That the vapour is immediately removed from the evaporation zone thereby that the latter contains or communicates with a cooling zone, where the vapour is condensed and the water of condensation is drawn off. By this means the evacuated chamber remains practically free from moisture during the process, 3. That it will be possible to use considerably higher temperatures than hitherto for example 200-500° C. or more, whereby the drying process is hastened.

Some forms of construction of the apparatus are shown on the annexed drawing. Fig. 1 is a vertical, longitudinal section of a drying apparatus in accordance with the present invention. Fig. 2 is a vertical cross-section along the line II—II in Fig. 1. Fig. 3 is a vertical longitudinal partial section of another form of construction. Figs. 4 and 5 show details.

The apparatus consists of a casing 1 which may suitably be provided on the inside with heat-insulation 2. One of the end-walls is in the form of a door 3 which can be opened when materials are to be put in or taken out and which is kept hermetically closed during the drying process. Inside the evacuated chamber A there are heat-batteries 4, which are well-insulated, not only against electric current but also against heat so that the conduction of heat to the other parts of the apparatus is prevented. Between the heat-batteries and at a suitable distance from them are supports for the materials to be dried, which are also insulated against conducted heat from the other parts of the apparatus.

Figs. 3, 3a and 3b show several methods of insulating the support and heating elements against conducted heat. The insulation may be effected by means of longitudinal rods or bands 6 of heat-insulating material (Fig. 3). Alternatively, the heating elements may be provided with transverse laths or feet 7 on which the supports rest (Fig. 3a). Again, the heating-elements 4 may be suspended by hooks 8 or other means of suspension from the supports, the hooks or other means of suspension being insulated or made of heat-insulating material (Fig. 3b).

For insulating against heat, any kind of material suitable for that purpose may be used, such as wood, cardboard, wood-fibre products, for example, masonite, also asbestos, Bakelite and other heat-insulating products of artificial resin, ebonite, mica, horn etc.

In Fig. 2 it is assumed that the heating is effected by electric current. The supports 5 and heating elements 4 are carried by a frame 30 of insulating material provided with insulated projections 9 on which said supports and elements rest. On the outer sides of said frame there are placed electric conductors 32 with which the heating elements are connected. The heating elements may be of any convenient construction, such as plates, bands, wires. The main lines and the terminals of the elements are electrically insulated from the metal parts of the apparatus.

The heating elements 4 are placed at a suitable distance from the supports 5 for the materials to be dried so that the heat transmitted to the latter is only radiated heat. The supports 5 may either be perforated or unperforated.

In the form of construction according to Fig. 1, a cooling battery 10 is placed at one of the ends, this battery consisting of a number of parallel tubes (see Fig. 2) placed closed alongside each other, through which cold water flows, the temperature of the water being such that effective cooling and consequently condensation of the water vapour is caused so that the latter is quickly removed from the evaporation zone.

In order further to accelerate the removal of the water vapour and its progress towards the cooling zone one or more fans or similar members 11 may be provided in the evaporation chamber.

12 is a pipe leading to the vacuum-pump 13. As this pipe leaves the apparatus on the side of the cooling batteries 10 in the evaporating chamber opposite to that on which the supports and heat-batteries are placed, no water-vapour escapes from said chamber into the vacuum pump as it is condensed when it comes into contact with the cooling batteries. Consequently, it is possible to maintain a very high vacuum, which is indicated by the gauge 14. Thus, the vacuum pump is not used for removing the water-vapour but only for maintaining the requisite vacuum.

The condensed water formed when the water-vapour comes into contact with the cooling batteries is collected in a recess 15 in the bottom of the cooling zone and is thence removed through the pipe 16 to the container 17, which may suitably be graduated so that the quantity of condensed water may be measured, thus giving a check on the progress of the drying process. On the pipe 16 there is a valve 18 and on the outlet pipe 19 a valve 20. When water is to be removed from the vessel 17 during the process, the valve 18 is closed and the valve 20 is opened.

In Fig. 3, the cooling batteries 10 consist of a number of hollow members in the longitudinal direction of the apparatus. In order to facilitate the running off of the condensed water, these members may be provided with flanges 21 (Fig. 4) which slope downwards. In order to prevent the condensed water from flowing into the apparatus, the latter is provided on the opposite side of the recess 15 with a lip or flange 22. The bottom of the apparatus may suitably be constructed so that it slopes a little towards the recess 15.

It is obvious that numerous variations in the forms of construction shown are possible so that the present invention is not limited to these forms of construction. Thus, for example, the cooling batteries in Fig. 3 may be constructed to reach along the entire longitudinal walls of the vacuum chamber or these walls may be fitted with a cooling jacket, in which case it is suitable to provide heat-insulating screens between the cooling jacket and the heat-batteries and supports.

Instead of placing special cooling batteries in the evacuated chamber the wall at that end of the apparatus may be provided with a cooling jacket as shown in Fig. 5. The rear wall 33 is provided with a jacket cooled by cold water supplied through tube 34 and led off through tube 35. The cooling jacket is insulated from the walls of the evaporation chamber at 36.

I claim:

1. Method of drying in vacuo liquid containing food substances susceptible to change under the action of heat, comprising placing said substances on metallic supports in a closed chamber and heat insulating said supports from metal surfaces of the apparatus, thus preventing heat from being transferred by conduction to said supports from said metallic surfaces, evacuating the chamber and supplying radiant heat from heating elements heated to at least 200° C. and located above and below each metallic support and at a distance from the same, the heat rays emanating from the heating elements located above the supports acting directly on the substances lying on said supports, and the heat rays emanating from the lower heating elements being first absorbed by the metallic supports from which heat is transferred to the products lying on the same, interrupting the heating before all the moisture is driven out from the substances and cooling the vapour driven off from the substances so as to be rapidly removed from the same.

2. Apparatus for drying food substances which contain liquid and are sensitive to heat, comprising a metallic casing enclosing an evaporating chamber, metallic supports in said chamber for the substances to be dried, heating elements in said chamber placed one on each side of each of the supports and at a distance therefrom and means for heating the same, means composed of heat insulating material between said metallic supports and the metallic casing and the heating elements for preventing heat of conduction from being led from said casing and elements to the supports, a vacuum pump connected to said chamber, and cooling elements in said chamber between the said supports and the suction conduit of the vacuum pump.

JOHAN GEORG WILHELM GENTELE.